United States Patent Office 3,585,171
Patented June 15, 1971

3,585,171
**ACCELERATING THE ANIONIC POLYMERIZA-
TION OF LACTAMS**
Adolf Steinhofer, Manfred Patsch, Helmut Doerfel, and
Georg Falkenstein, Ludwigshafen (Rhine), and Wolf-
gang-Dieter Jeserich, Lambsheim, Pfalz, Germany, as-
signors to Badische Anilin- & Soda-Fabrik Aktien-
gesellschaft, Ludwigshafen (Rhine), Germany
No Drawing. Filed June 27, 1968, Ser. No. 740,468
Claims priority, application Germany, July 5, 1967,
P 17 20 281.2
Int. Cl. C08g 20/18
U.S. Cl. 260—78        5 Claims

ABSTRACT OF THE DISCLOSURE

A process for accelerating polymerization of lactams carried out in the presence of alkaline catalysts at temperatures of from 80° to 200° C. using lactam-N-carboxylic acid carbazolamides as activators.

This invention relates to a process for accelerating the anionic polymerization of lactams by means of specially advantageous activators.

It is known that polyamides can be produced by polymerization of monomeric lactams in the presence of alkaline catalysts, for example alkali metals such as sodium and potassium or their basic compounds such as the amides or hydrides, alkali metal lactam compounds or organometallic compounds of the metals of main Groups I to III of the Periodic System at temperatures above 200° C.

It is also known that this prior art method, generally known as anionic polymerization, can be carried out under much milder conditions in the presence of activators.

Known activators include acylated lactams such as N-acetylcaprolactam or compounds having an acylating action such as isocyanates, ketenes, acid chlorides, carbodiimides, cyanamides and acid anhydrides, and also compounds which bear sulfonyl, phosphenyl, nitroso, thiocarbonyl or thiophenyl radicals on the lactam nitrogen.

The sensitivity to water and oxygen of these compounds makes it necessary to carry out the process in the absence of oxygen and in an hydrous medium. The process is therefore not very suitable for polymerizing commercially pure lactam which always contains small amounts of water.

Carboxylic esters, urethanes and plurally acylated amines are also known as activators. Although these compounds are physiologically safer than the abovementioned activators, some of which are strongly corrosive, their accelerating action is much less.

Finally it is known that compounds according to the formulae: (R)$_2$—N—CX—N(R)$_2$, (R)$_2$—N—CO—OR and (R)$_2$—N—C(NR)—R in which X denotes oxygen, sulfur or the divalent group NR and R denotes a hydrogen atom or any organic radical, at least one radical R attached to nitrogen denoting an organic radical. The effective compounds are derived from foundation compounds (urea, thiourea, guanidine, urethane, amidine and isothiourea) by substitution of at least one hydrogen atom attached to nitrogen by an organic radical.

In accordance with the present invention a particularly advantageous process for accelerating the anionic polymerization of lactams in the presence of alkaline polymerization catalysts and activators at from 80° to 200° C., in the presence or absence of inert solvents, comprises using as activator a compound having the general formula:

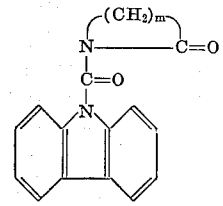

in which $m$ denotes one of the integers from 2 to 11. Those compounds are particularly suitable in which $m$ denotes one of the integers from 5 to 7.

The advantage of the new activators over the prior art activators is that conventional additives which regulate the chain length are no longer necessary. Moreover the pot life and K value may be varied widely.

Another advantage of the activators according to the invention is that when they are used, polyamides are obtained which have particularly stable terminal groups. The activators according to the invention are moreover physiologically inocuous and may therefore be used for carrying out the anionic polymerization of lactams without any special precautions.

Polymerization may be carried out in a conventional manner. The individual components of the polymerization batch may be brought together in any sequence.

The activators according to the invention may be used in amounts of 0.01 to 15%, preferably 0.5 to 5%, by weight with reference to the weight of the lactam to be polymerized. Amounts deviating from these ranges may be used, however, for special purposes. Obviously, mixtures of these new activators in any proportions may also be used.

Polymerization may be carried out in known manner advantageously at temperatures of from 80° to 200° C., preferably from 100° to 160° C., although temperatures which are higher or lower than these ranges may be used for special purposes.

Catalysts such as the alkali metals or alkaline earth metals, for example sodium, potassium, calcium or their basic compounds such as the amides or hydrides, the alkali metal lactam compounds or organometallic compounds of metals of main groups I to III of the Periodic System may be used as the polymerization catalysts.

Lactams which can be polymerized by this new process are particularly pyrrolidone, piperidone, caprolactam, capryllactam, oenantholactam, caprilactam, laurolactam, substituted lactams such as epsilon-ethyl-epsilon-caprodactam, zeta-ethyl-zeta-oenthaolactam or methylene-bis-caprolactams which are known to be obtainable by the reaction of methylene-bis-cyclohexanone with hydroxylamine followed by Beckman rearrangement, or mixtures of the abovementioned compounds.

Polymerization may be carried out in the presence of inert solvents such as aliphatic and aromatic hydrocarbons or ethers. In this case polyamide powder is obtained which is suitable for example for the production of coatings by the whirl sinter method, as clarifying agents for various drinks or as a binder for nonwovens.

Soluble or insoluble dyes and fillers of all types may be added to the polymerization batch provided they do not impair the action of the activator-catalyst system. These include conventional plastics and, among others, inorganic substances such as glass fibers, asbestos, other ceramic materials, graphite, gypsum, chalk, molybdenum disulfide and natural substances such as pretreated sawdust, natural synthetic and semisynthetic fibers and the like.

The process may be carried out in batch or continuously for example in polymerization tubes or in polymerization towers having discharge means such as spinning pumps or screws. Pipes, rods, boards, film, sheeting, strip and the like and also filaments and threads, including those for tyre cord, may be prepared direct by methods which are not claimed per se.

The process according to the invention is also suitable for the production of large blocks of polyamide, of intricate moldings by the melt casting, centrifugal casting or rolling casting methods, for the production of expanded moldings, corrosion-proof polyamide coatings, for forming viscoelastic intermediate layers, for bonding, jointing and laminating conventional materials. The polyamides obtained may also be granulated and further processed by conventional processing methods, for example injection molding, extruding or spinning.

Since the activators to be used in accordance with the invention are compounds which have not hitherto been described in the literature, the production of caprolactam-N-carboxylic carbazolamide will now be described.

167 g. (1 mole) of carbazole, 101 g. (1 mole) of triethylamine and 400 ml. of toluene are placed in a four-necked flask fitted with a stirrer, reflux condenser, thermometer and gas inlet pipe.

The mixture is heated to 90° to 100° C., about 110 g. of phosgene is gassed in, whole is allowed to cool and the residual phosgene is expelled with nitrogen.

Another 111 g. (1.1 moles) of triethylamine and 120 g. (1.06 moles) of caprolactam are then added to the reaction mixture and the whole is stirred for five hours at 80° to 100° C.

The product is cooled to room temperature and the solidified reaction product is stirred with about 400 ml. of water. The water is then filtered off again, the residue is washed twice, each time with 300 ml. of water, and dried in a vacuum drying cabinet at 50° C. and 30 torr.

216 g. of a product having a melting point of 142° to 153° C. are obtained. After it has been recrystallized from methanol, methyl glycol or ethyl acetate, the caprolactam-N-carboxylic carbazolamide has a melting point of 187° to 190° C.

By using an equivalent amount of other unsubstituted lactams having four to thirteen ring members instead of 1.06 mole of caprolactam, the homologous lactam-N-carboxylic carbazolamides are obtained.

The invention is illustrated by the following examples. The parts and percentages given in the following examples are by weight.

EXAMPLE 1

43 parts of caprolactam and 7 parts of a 17% solution of sodium caprolactam in caprolactam are fused together and intensely mixed at 130° C. with a solution of 3.0 parts of caprolactam-N-carboxylic acid carbazolamide in 48.1 parts of caprolactam. The mixture then begins to polymerize. It is viscous after one minute eighteen seconds and is solid after two minutes forty-two seconds. The temperature of the mixture rises after one minute forty-two seconds to 180° C. The polymer has an extract content of 5.6%. The K value cannot be measured because the polymer does not completely dissolve in 96% sulfuric acid.

EXAMPLE 2

The starting materials used in Example 1 are intensely mixed at 150° C. The mixture then begins to polymerize. It is viscous after twentyseven seconds and solid after two minutes fifty-seven seconds. The temperature of the mixture rises in one minute fifteen seconds to 200° C. The polymer has an extract content of 8.5%. The K value cannot be measured because the polymer does not dissolve completely in 96% sulfuric acid.

EXAMPLE 3

43 parts of caprolactam and 7 parts of a 17% solution in caprolactam of sodium caprolactam are melted together and intensely mixed at 130° C. with a solution of 1.5 parts of caprolactam-N-carboxylic acid was carbazolamide in 48.1 parts of caprolactam. The mixture then begins to polymerize. It is viscous after 1 minute fifty-four seconds and solid after two minutes forty-five seconds. The temperature of the mixture rises to 180° C. in two minutes fifty-two seconds. The polymer has an extract content of 4.0%. The K value cannot be measured because the polymer does not dissolve completely in 90% sulfuric acid.

We claim:

1. In a process for the activated anionic polymerization of lactams in the presence of alkaline catalysts at temperatures of from 80° to 200° C. the improvement which comprises using as an activator compound having the formula:

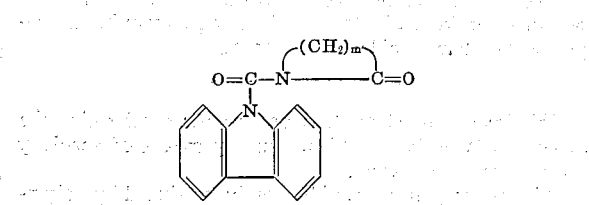

in which $m$ denotes one of the integers 2 to 11.

2. In a process for the activated anionic polymerization of lactams in the presence of alkaline catalysts at temperatures of from 80° to 200° C. the improvement which comprises using as an activator a compound having the formula:

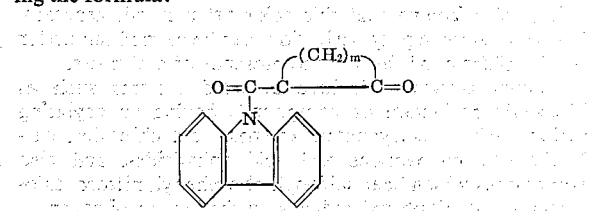

in which $m$ denotes one of the integers 5, 6 and 7.

3. A process as claimed in claim 1 using caprolactam-N-carboxylic carbazolamide as activator.

4. A process as claimed in claim 1 carried out in the presence of an inert solvent.

5. A process as claimed in claim 2 using caprolactam-N-carboxylic carbazolamide as activator.

References Cited

UNITED STATES PATENTS 3,274,132    9/1966    Giberson _____ 260—78X
3,350,364    10/1967   Reimschuessel et al. ___ 260—78

WILLIAM H. SHORT, Primary Examiner

L. M. PHYNES, Assistant Examiner

PO-1050
(5/69)

UNITED STATES PATENT OFFICE
CERTIFICATE OF CORRECTION

Patent No. 3,585,171  Dated June 15, 1971

Inventor(s) Adolf Steinhofer et al

It is certified that error appears in the above-identified patent and that said Letters Patent are hereby corrected as shown below:

Column 2, line 51, "dactam" should read -- lactam --.

Column 4, line 13, "was" should read -- and --; line 18, "fifty-two" should read -- fifty-one --; line 20, "90%" should read -- 96% --.

Signed and sealed this 21st day of March 1972.

(SEAL)
Attest:

EDWARD M. FLETCHER, JR.         ROBERT GOTTSCHALK
Attesting Officer                Commissioner of Patents